(12) United States Patent
Miyanaga

(10) Patent No.: US 9,583,952 B2
(45) Date of Patent: Feb. 28, 2017

(54) SHUNT CIRCUIT, CHARGING SYSTEM AND INTEGRATED CIRCUIT

(71) Applicant: ROHM CO., LTD., Kyoto (JP)

(72) Inventor: Koichi Miyanaga, Kyoto (JP)

(73) Assignee: ROHM CO., LTD. (JP)

( * ) Notice: Subject to any disclaimer, the term of this patent is extended or adjusted under 35 U.S.C. 154(b) by 199 days.

(21) Appl. No.: 14/106,346

(22) Filed: Dec. 13, 2013

(65) Prior Publication Data
US 2014/0167684 A1 Jun. 19, 2014

(30) Foreign Application Priority Data

Dec. 14, 2012 (JP) .................................. 2012-273273

(51) Int. Cl.
*H02J 7/00* (2006.01)

(52) U.S. Cl.
CPC ...... *H02J 7/0016* (2013.01); *H02J 2007/0037* (2013.01)

(58) Field of Classification Search
CPC .................................................... H02J 7/0016
See application file for complete search history.

(56) References Cited

U.S. PATENT DOCUMENTS

| | | | | |
|---|---|---|---|---|
| 5,850,136 A * | 12/1998 | Kaneko | ................ | H02J 7/0016 320/119 |
| 5,932,990 A * | 8/1999 | Kaneko | ................ | H02J 7/0016 320/122 |
| 5,952,815 A * | 9/1999 | Rouillard et al. | ............ | 320/116 |
| 6,002,239 A * | 12/1999 | Maloizel | ................ | H02J 7/0011 320/136 |
| 7,034,580 B2 * | 4/2006 | Yano et al. | ..................... | 327/74 |
| 7,830,123 B2 * | 11/2010 | Diraison | ........... | H01M 10/0525 320/136 |
| 7,893,656 B2 * | 2/2011 | Sobue | .......................... | 320/134 |
| 7,965,061 B2 * | 6/2011 | Li et al. | ....................... | 320/152 |
| 8,917,061 B2 * | 12/2014 | Zhu | ............................... | 320/119 |
| 8,947,052 B2 * | 2/2015 | Nishizawa et al. | ........... | 320/134 |
| 2005/0269989 A1 * | 12/2005 | Geren et al. | .................. | 320/119 |
| 2008/0191747 A1 * | 8/2008 | Konmoto | ....................... | 327/63 |
| 2013/0241471 A1 * | 9/2013 | Arai et al. | ..................... | 320/107 |
| 2014/0015490 A1 * | 1/2014 | Tsai | ...................... | H02J 7/0042 320/134 |

FOREIGN PATENT DOCUMENTS

JP  2012-147587 A  8/2012
JP  2012-228002 A  11/2012

* cited by examiner

*Primary Examiner* — Drew A Dunn
*Assistant Examiner* — Tynese McDaniel
(74) *Attorney, Agent, or Firm* — Cantor Colburn LLP

(57) ABSTRACT

A shunt circuit includes: a shunt resistor; a transistor connected in parallel to a storage element via the shunt resistor; a first OP amplifier configured to compare a battery voltage supplied to the storage element with a detection voltage; and a second OP amplifier configured to shunt a shunt current from a charging current supplied from a charging unit when the battery voltage reaches the detection voltage. The detection voltage is increased step by step, and the shunt current is increased whenever the battery voltage reaches the detection voltage.

12 Claims, 15 Drawing Sheets

SHUNT CIRCUIT, CHARGING SYSTEM AND INTEGRATED CIRCUIT

CROSS-REFERENCE TO RELATED APPLICATION

This application is based upon and claims the benefit of priority from Japanese Patent Application No. 2012-273273, filed on Dec. 14, 2012, the entire contents of which are incorporated herein by reference.

TECHNICAL FIELD

The present disclosure relates to a shunt circuit, a charging system and an integrated circuit.

BACKGROUND

Conventionally, there have been proposed techniques for collectively charging a plurality of serial-connected cells (lithium ion battery cells or the like) to achieve resource savings of a charging system. Such a charging scheme may result in cell overcharging due to mismatching of a balance of the cells. Thus, there has been known a shunt resistance scheme as a means for preventing such cell overcharging.

However, in some cases, such a conventional shunt resistance scheme may not prevent cell overcharging since this scheme is configured to flow a shunt current only by an operation of a switch. For example, if a cell is deteriorated due to aging, an increase in a battery voltage supplied to the cell cannot be sufficiently suppressed, which may result in overcharging of the cell. In particular, since a lifetime of a lithium ion battery cell may be shortened due to overcharging, there is a need to prevent the overcharging.

SUMMARY

The present disclosure provides some embodiments of a shunt circuit which can prevent cells from being overcharged, a charging system and an integrated circuit.

According to one embodiment of the present disclosure, there is provided a shunt circuit including: a shunt resistor; a transistor connected in parallel to a storage element via the shunt resistor; a first OP amplifier configured to compare a battery voltage supplied to the storage element with a detection voltage; and a second OP amplifier configured to drive the transistor to shunt a shunt current from a charging current when the battery voltage reaches the detection voltage, wherein the detection voltage is increased step by step, and the shunt current is increased whenever the battery voltage reaches the detection voltage.

According to another embodiment of the present disclosure, there is provided a shunt circuit including: a shunt resistor; a transistor connected in parallel to a storage element via the shunt resistor; and a second OP amplifier configured to drive the transistor to shunt a shunt current from a charging current when a battery voltage reaches a detection voltage, wherein the shunt current is increased whenever the battery voltage reaches the detection voltage.

According to another embodiment of the present disclosure, there is provided a charging system including: a charging unit configured to generate a charging current; a plurality of storage elements connected in series to the charging unit; and a plurality of shunt circuits which are connected respectively in parallel to the plurality of storage cells and are configured to shunt a shunt current from the charging current when a battery voltage supplied to the storage elements reaches a detection voltage, wherein the shunt circuits increase the detection voltage step by step and, at the same time, increase the shunt current whenever the battery voltage reaches the detection voltage.

According to another embodiment of the present disclosure, there is provided an integrated circuit equipped with any one of the above-described shunt circuits.

DETAILED DESCRIPTION

Figure 1:
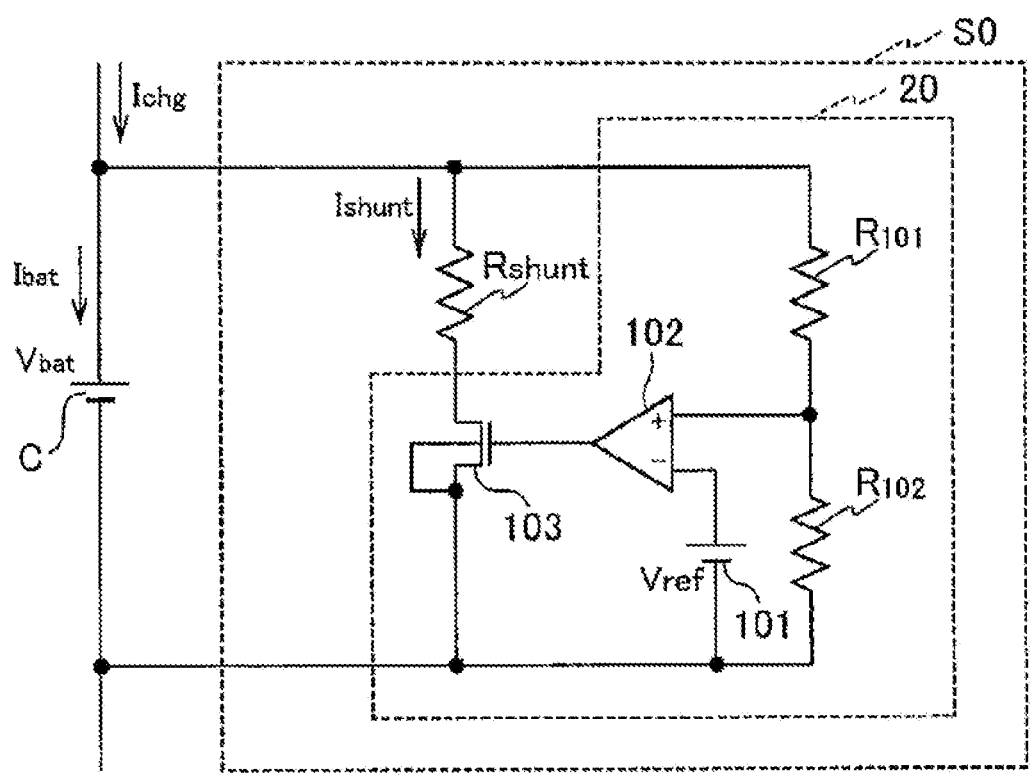
FIG. 1 is a schematic circuit block diagram of a shunt circuit.

Embodiments of the present disclosure will now be described in detail with reference to the drawings. Throughout the drawings, the same or similar elements are denoted by the same or similar reference numerals. It is however noted that the drawings are just schematic and relationships between thickness and planar dimension of elements, thickness ratios of various layers and so on may be unrealistic. Accordingly, details of thickness and dimensions should be determined in consideration of the following description. In addition, it is to be understood that the figures include different dimensional relationships and ratios.

The following embodiments are provided to illustrate devices and methods to embody the technical ideas of the present disclosure and are not limited to materials, forms, structures, arrangements and so on of elements detailed herein. The embodiments of the present disclosure may be modified in different ways without departing from the spirit and scope of the invention defined in the claims.

[Basic Configuration]

(Shunt Circuit)

FIG. 1 is a schematic circuit block diagram of a shunt circuit S0. As shown in FIG. 1, the shunt circuit S0 is connected in parallel to a cell C and includes a reference voltage generator 101, an operational (OP) amplifier 102, a transistor 103, resistors $R_{101}$ and $R_{102}$ and a shunt resistor $R_{shunt}$. The cell C is an electricity storage element such as a lithium ion battery cell, an electric double layer capacitor cell, a lithium ion capacitor cell, a SCiB® cell or the like, and is charged/discharged according to predetermined charging characteristics and discharging load characteristics.

When a battery voltage $V_{bat}$ supplied to the cell C reaches a reference voltage $V_{ref}$, the OP amplifier 102 drives the transistor 103 to shunt a shunt current $I_{shunt}$ from a charging current $I_{chg}$. This can limit a battery current $I_{bat}$ flowing into the cell C, thereby preventing an increase in the battery voltage $V_{bat}$.

A dotted line 20 shown in FIG. 1 indicates an area that may be mounted on an integrated circuit such as an LSI (Large Scale Integration). Of course, the shunt resistor $R_{shunt}$ may also be mounted on the LSI.

(Charging System)

Figure 2:
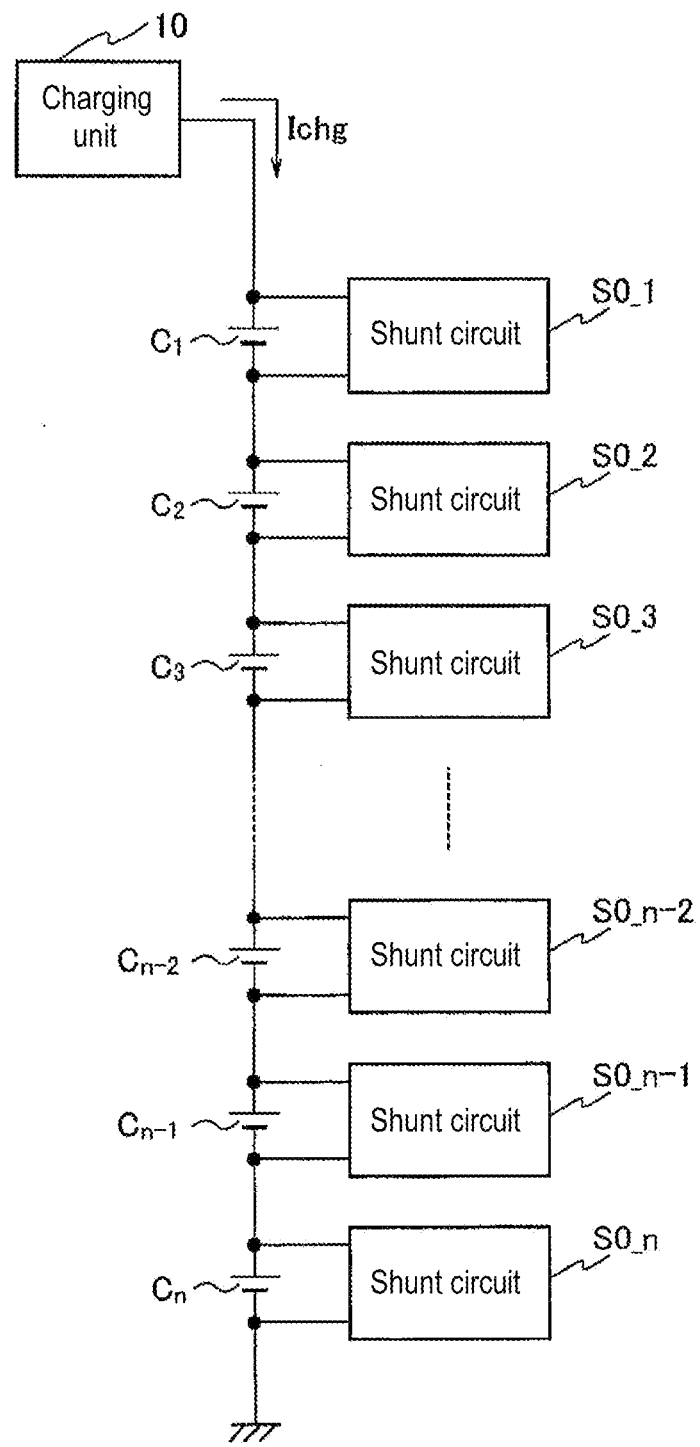
FIG. 2 is a schematic circuit block diagram of a charging system including the shunt circuit.

FIG. 2 is a schematic circuit block diagram of a charging system 100. As shown in FIG. 2, the charging system 100 includes a charging unit 10 generating the charging current $I_{chg}$, a plurality of cells $C_1, C_2, C_3, \ldots, C_{n-2}, C_{n-1}$ and $C_n$, connected in series to the charging unit 10, and a plurality of shunt circuits S0_1, S0_2, S0_3, ..., S0_n-2, S0_n-1 and S0_n connected respectively in parallel to the plurality of cells $C_1, C_2, C_3, \ldots, C_{n-2}, C_{n-1}$ and $C_n$.

The cells $C_1, C_2, C_3, \ldots, C_{n-2}, C_{n-1}$ and $C_n$, may be lithium ion battery cells. About 5 to 16 cells may be connected in series. In addition, the same number of shunt circuits S0_1, S0_2, S0_3, S0_n-2, S0_n-1 and S0_n are connected respectively to the plurality of cells $C_1, C_2, C_3, \ldots, C_{n-2}, C_{n-1}$ and $C_n$, in parallel.

Each of the cells $C_1, C_2, C_3, \ldots, C_{n-2}, C_{n-1}$ and $C_n$ is uniformly stored with charging energy in proportion to the current-time product of the battery current $I_{bat}$. Therefore, after the smallest-capacity cell initially reaches a full charging voltage, charging continues until all of the cells $C_1, C_2, C_3, \ldots, C_{n-2}, C_{n-1}$ and $C_n$ reach the full charging voltage.

Therefore, each cell $C_1, C_2, C_3, \ldots, C_{n-2}, C_{n-1}$ and $C_n$, is provided with a bypass path through which a cell having a battery voltage $V_{bat}$ higher than the full charging voltage is bypassed while a cell having a battery voltage $V_{bat}$ lower than the full charging voltage is being charged, thereby achieving an uniform cell voltage. For example, if the cell $C_1$ initially reaches the full charging voltage, the shunt circuit S0_1 shunts a shunt current $I_{shunt}$ from the charging current $I_{chg}$ to prevent overcharging of the cell $C_1$. The same is true of other shunt circuits S0_1, S0_n.

Figure 3:
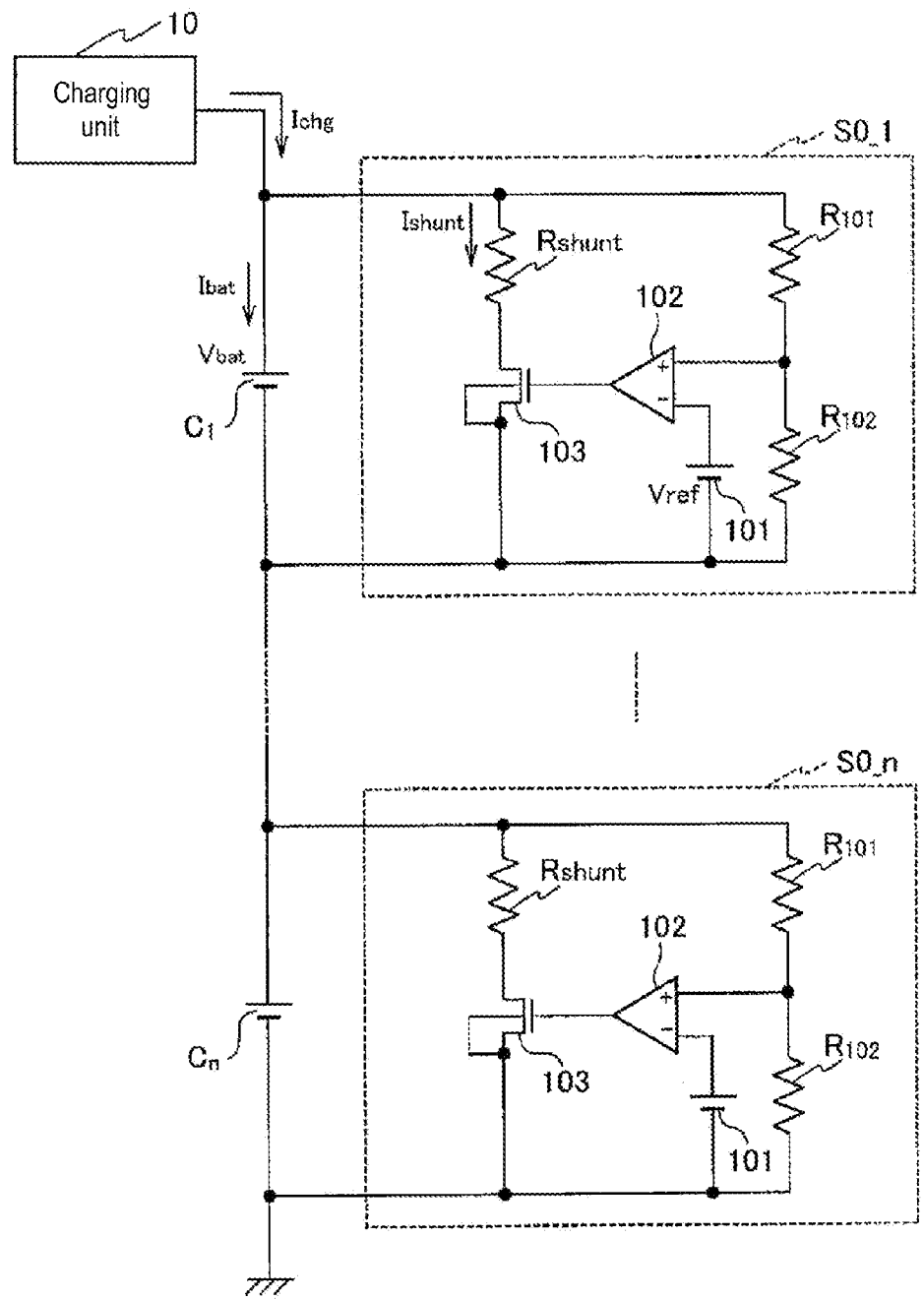
FIG. 3 is a detailed schematic circuit block diagram of the shunt circuit of the charging system.

FIG. 3 is a detailed schematic circuit block diagram of the charging system 100. As shown in FIG. 3, the OP amplifier 102 has a non-inverted input terminal connected to both terminals of the cell $C_1$ via the resistors $R_{101}$ and $R_{102}$ and an inverted input terminal connected to a negative (−) terminal of the cell $C_1$ via the reference voltage generator 101. The transistor 103 has a drain connected to a positive (+) terminal of the cell $C_1$ via the shunt resistor $R_{shunt}$, a source connected to the negative terminal of the cell $C_1$, and a gate connected to an output terminal of the OP amplifier 102.

(Waveform Example)

Figure 4A:
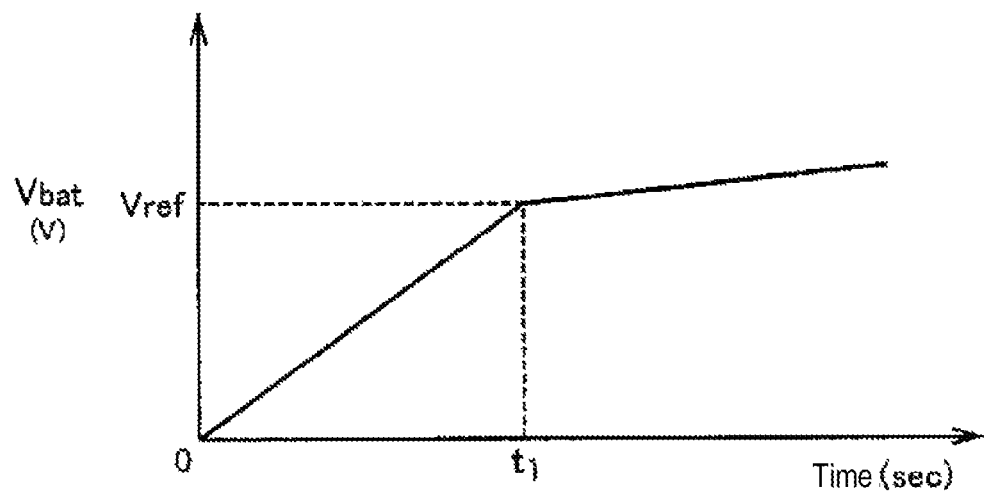
FIGS. 4A to 4C are graphs schematically showing waveform examples of a battery voltage, a battery current, and a shunt current, respectively, in the charging system.
Figure 4B:
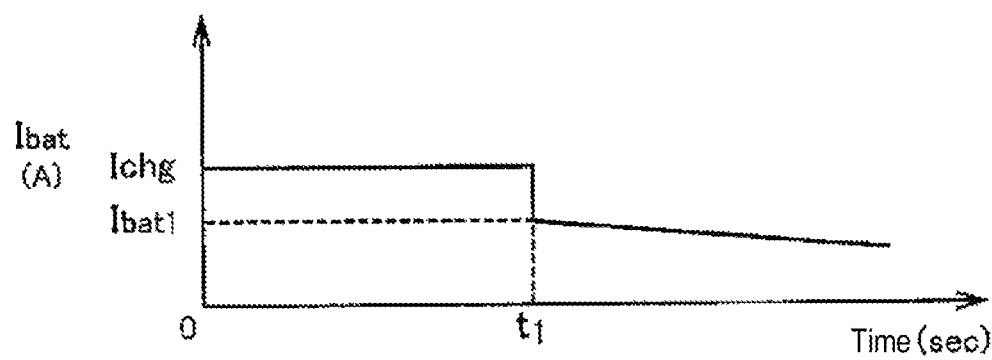
Figure 4C:
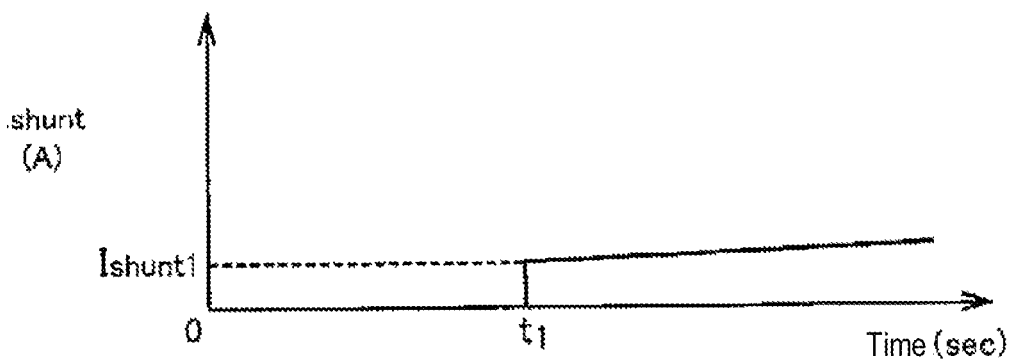

FIGS. 4A to 4C are graphs schematically showing waveform examples of the battery voltage $V_{bat}$, the battery current $I_{bat}$, and the shunt current, respectively, in the charging system 100.

First, when the charging current $I_{chg}$ generated by the charging unit 10 flows into the cell $C_1$ as shown in FIG. 4B, the battery voltage $V_{bat}$ increases in proportion to the charging time as shown in FIG. 4A. The OP amplifier 102 compares the battery voltage $V_{bat}$ with the reference voltage $V_{ref}$. Then, when the battery voltage $V_{bat}$ reaches the reference voltage $V_{ref}$ after a lapse of time $t_1$, the transistor 103 is driven. Accordingly, a shunt current $I_{shunt1}$ flows out via the shunt resistor $R_{shunt}$, as shown in FIG. 4C. The shunt current $I_{shunt}$ is expressed by the following equation (1).

$$I_{shunt} = V_{bat}/R_{shunt} \quad (1)$$

When the shunt current $I_{shunt1}$ flows out, the battery current $I_{bat}$ has a value $I_{bat1}$ which corresponds to a subtraction of the shunt current $I_{shunt1}$ from the charging current $I_{chg}$, as shown in FIG. 4B. Accordingly, as shown in FIG. 4A, the rising of the battery voltage $V_{bat}$ can be suppressed after the time $t_1$. Although the description is here given to the cell $C_1$, it is noted that this description is true of other cells $C_2, \ldots, C_n$. It is, however, noted that different cell balances provide different slopes of the battery voltage $V_{bat}$.

[First Embodiment]

A first embodiment will now be described. The same configurations as the basic configuration are denoted by the same reference numerals and explanation of which will not be repeated.

(Shunt Circuit)

Figure 5:
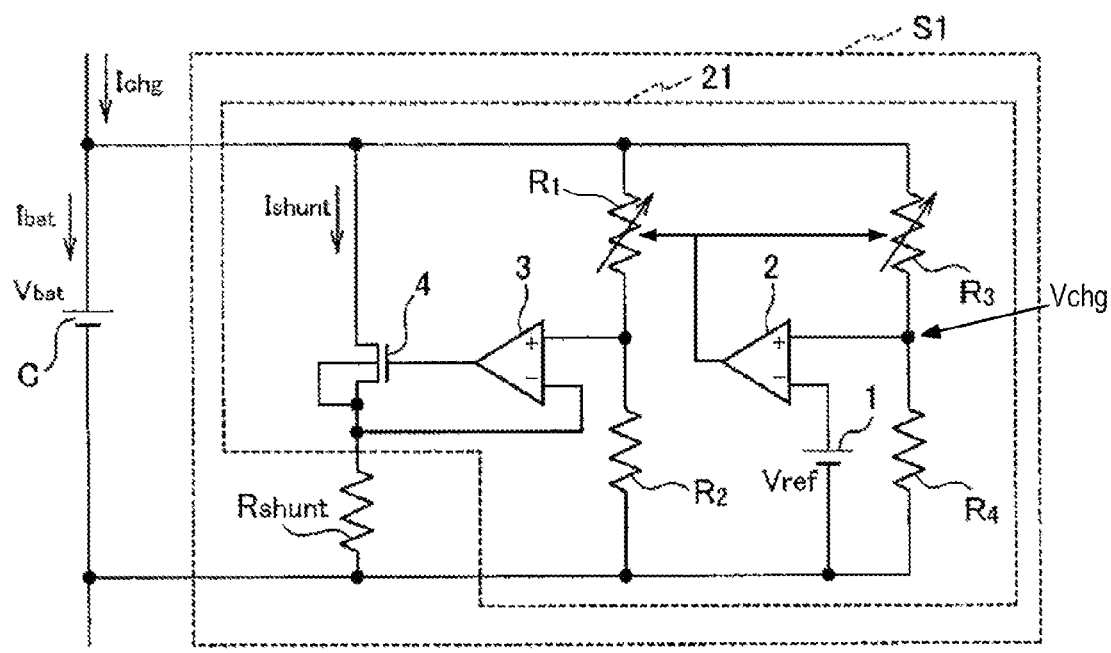
FIG. 5 is a schematic circuit block diagram of a shunt circuit according to a first embodiment.

FIG. 5 is a schematic circuit block diagram of a shunt circuit S1 according to the first embodiment. The shunt circuit S1 includes a shunt resistor $R_{shunt}$, a transistor 4 connected in parallel to a storage element (cell) C via the shunt resistor $R_{shunt}$, a reference voltage generator 1 which generates a reference voltage $V_{ref}$, a first OP amplifier 2 which compares the reference voltage $V_{ref}$ with a detection voltage $V_{chg}$ that may have two or more predetermined values, and a second OP amplifier 3 which drives the transistor 4 to shunt a shunt current $I_{shunt}$ from a charging current $I_{chg}$ when the detection voltage $V_{chg}$ reaches the reference voltage $V_{ref}$. In the first embodiment, the detection voltage $V_{chg}$ may be increased step by step whenever the detection voltage $V_{chg}$ reaches the reference voltage $V_{ref}$, and the shunt current $I_{shunt}$ is increased when the detection voltage $V_{chg}$ is increased.

Further, the shunt circuit S1 includes first sense resistors $R_3$ and $R_4$ connected to an input terminal of the first OP amplifier 2, and second sense resistors $R_1$ and $R_2$ connected to an input terminal of the second OP amplifier 3. The detection voltage $V_{chg}$ may be increased by changing the resistance of the first sense resistors $R_3$ and $R_4$, and the shunt current $I_{shunt}$ may be increased by changing the resistance of the second sense resistors $R_1$ and $R_2$.

Assuming that a current value of the shunt current $I_{shunt}$ is $I_{shunt}$, a resistance of the shunt resistor $R_{shunt}$ is $R_{shunt}$, a voltage value of the battery voltage $V_{bat}$ is $V_{bat}$ and resistances of the second sense resistors $R_1$ and $R_2$ are $R_1$ and $R_2$, respectively, the current value $I_{shunt}$ of the shunt current $I_{shunt}$ may be increased according to the equation of $I_{shunt} = \{[R_2/(R_1+R_2)]V_{bat}\}/R_{shunt}$ by changing the resistance $R_1$ of the second sense resistor $R_1$.

Assuming that a voltage value of the detection voltage $V_{chg}$ is $V_{chg}$, a voltage value of the reference voltage $V_{ref}$ supplied to the first OP amplifier 2 is $V_{ref}$ and resistances of the first sense resistors $R_3$ and $R_4$ are $R_3$ and $R_4$, respectively, the voltage value $V_{chg}$ of the detection voltage $V_{chg}$ may be increased according to the equation of $V_{chg} = R4/(R3+R4) \cdot V_{bat} = V_{ref}$ by changing the resistance $R_3$ of the first sense resistor $R_3$.

The shunt resistor $R_{shunt}$ may be connected to a source of the transistor 4.

The storage element C may be one of a lithium ion battery cell, an electric double layer capacitor cell, a lithium ion capacitor cell and a SCiB cell.

The shunt circuit S1 may be mounted on an integrated circuit such as LSI.

As shown in FIG. 5, the shunt circuit S1 according to the first embodiment includes the reference voltage generator 1, the first OP amplifier 2, the second OP amplifier 3, the transistor 4, the resistors $R_1$, $R_2$, $R_3$ and $R_4$ and the shunt resistor $R_{shunt}$. While the shunt resistor $R_{shunt}$ is disposed on a shunt line, the resistors $R_1$, $R_2$, $R_3$ and $R_4$ are disposed on the sense lines. In the following description, the resistors $R_3$ and $R_4$ may be referred to as "first sense resistors" and the resistors $R_3$ and $R_4$ may be referred to as "second sense resistors." The resistors $R_1$ and $R_3$ are variable resistors but may be simply referred to as resistors.

The first OP amplifier 2 compares the reference voltage $V_{ref}$ with the detection voltage $V_{chg}$. As described above, the detection voltage $V_{chg}$ is calculated based on the battery voltage $V_{bat}$. When the detection voltage $V_{chg}$ reaches the reference voltage $V_{ref}$, the second OP amplifier 3 drives the transistor 4 to shunt the shunt current $I_{shunt}$ from the charging current $I_{chg}$.

In the first embodiment, the detection voltage $V_{chg}$ is increased step by step, and the shunt current $I_{shunt}$ is increased whenever the detection voltage $V_{chg}$ reaches the reference voltage $V_{ref}$. This can more limit the battery current $I_{bat}$ than the basic configuration, thereby further preventing an increase in the battery voltage $V_{bat}$. Accordingly, the storage element C can be prevented from being overcharged even when the storage element C is deteriorated with aging.

A dotted line 21 shown in FIG. 5 indicates an area that may be mounted on an LSI (Large Scale Integration). Of course, the shunt resistor $R_{shunt}$ may also be mounted on the LSI.

(Charging System)

Figure 6:
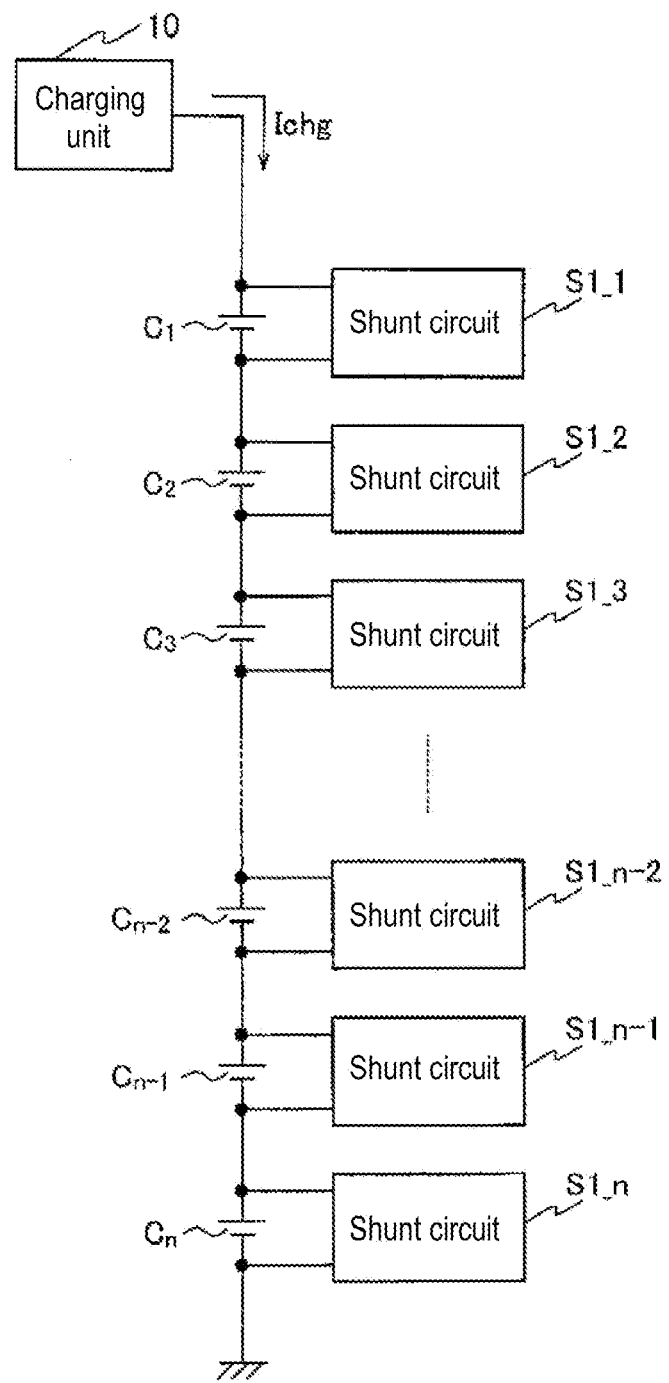
FIG. 6 is a schematic circuit block diagram of a charging system including the shunt circuit according to the first embodiment.

FIG. 6 is a schematic circuit block diagram of a charging system 110 according to the first embodiment. As shown in FIG. 6, the charging system 110 according to the first embodiment includes a charging unit 10 generating the charging current $I_{chg}$, a plurality of cells $C_1$, $C_2$, $C_3$, ..., $C_{n-2}$, $C_{n-1}$ and $C_n$ connected in series to the charging unit 10, and a plurality of shunt circuits $S1_{13}$ 1, $S1_{13}$ 2, $S1_{13}$ 3, ..., $S1_{13}$ n-2, $S1_{13}$ n-1 and $S1_{13}$ n which are connected respectively in parallel to the plurality of cells $C_1$, $C_2$, $C_3$, ..., $C_{n-2}$, $C_{n-1}$ and $C_n$ and shunt the shunt current $I_{shunt}$ from the charging current $I_{chg}$. While increasing the detection voltage $V_{chg}$ step by step, the shunt circuits $S1_{13}$ 1, $S1_{13}$ 2, $S1_{13}$ 3, ..., $S1_{13}$ n-2, $S1_{13}$ n-1 and $S1_{13}$ n increases the shunt current $I_{shunt}$ whenever the detection voltage $V_{chg}$ reaches the reference voltage $V_{ref}$.

Figure 7:
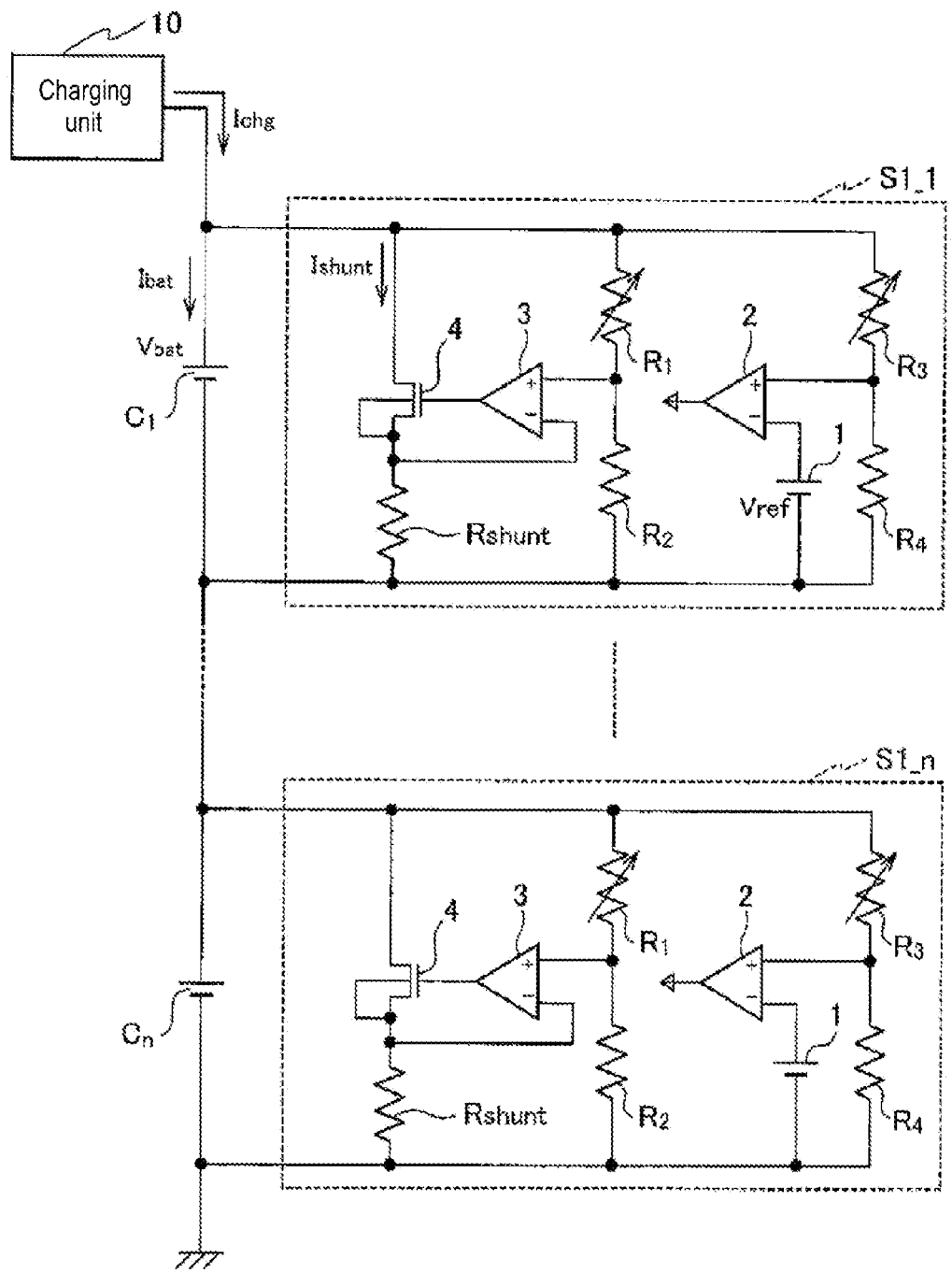
FIG. 7 is a detailed schematic circuit block diagram of the shunt circuit of the charging system according to the first embodiment.

FIG. 7 is a detailed schematic circuit block diagram of the charging system 110 according to the first embodiment. As shown in FIG. 7, the first OP amplifier 2 has a non-inverted input terminal connected to both terminals of the cell $C_1$ via the resistors $R_3$ and $R_4$ and an inverted input terminal connected to a negative (−) terminal of the cell $C_1$ via the reference voltage generator 1. The second OP amplifier 3 has a non-inverted input terminal connected to both terminals of the cell $C_1$ via the resistors $R_1$ and $R_2$ and an inverted input terminal connected to the negative (−) terminal of the cell $C_1$ via the shunt resistor $R_{shunt}$. The transistor 4 has a drain connected to a positive (+) terminal of the cell $C_1$, a source connected to the negative terminal of the cell $C_1$ via the shunt resistor $R_{shunt}$, and a gate connected to an output terminal of the second OP amplifier 3.

(Waveform Example)

Figure 8A:
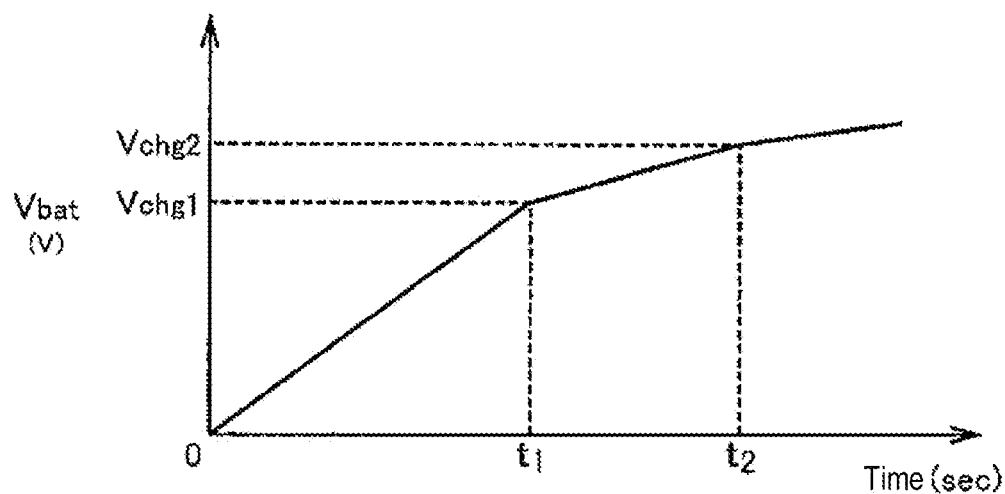
FIGS. 8A to 8C are graphs schematically showing waveform examples of a battery voltage, a battery current, and a shunt current, respectively, in the charging system according to the first embodiment.
Figure 8B:
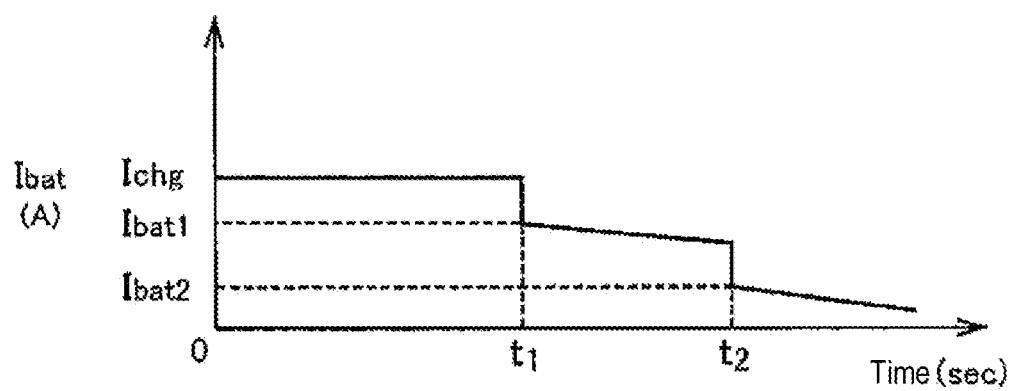
Figure 8C:
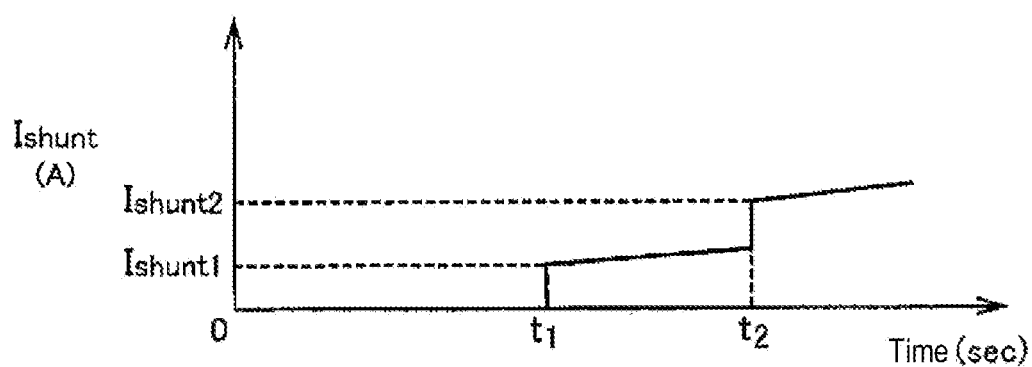

FIGS. 8A to 8C are graphs schematically showing waveform examples of the battery voltage $V_{bat}$, the battery current $I_{bat}$, and the shunt current $I_{shunt}$, respectively, in the charging system 110 according to the first embodiment.

In the first embodiment, the detection voltage $V_{chg}$ may have at least two values including a first detection voltage $V_{chg1}$ and a second detection voltage $V_{chg2}$ that is higher than the first detection voltage $V_{chg1}$. First, when the detection voltage $V_{chg}$ reaches the first detection voltage $V_{chg1}$ with the lapse of time t1 as shown in FIG. 8A, the first OP amplifier 2 transmits a detection signal to the second OP amplifier 3. At this time, the detection voltage $V_{chg}$ is increased from $V_{chg1}$ to $V_{chg2}$ by increasing the resistance of the resistor $R_3$. Since the detection voltage $V_{chg}$ and the reference voltage $V_{ref}$ have the relationship expressed by the following equation (2), the battery voltage $V_{bat}$ is expressed by the following equation (3).

$$V_{chg} = R4/(R3+R4) \cdot V_{bat} = V_{ref} \quad (2)$$

$$V_{bat} = (R3+R4)/R4 \cdot V_{ref} \quad (3)$$

Upon receiving the detection signal, the second OP amplifier 3 drives the transistor 4. Thereby, the shunt current $I_{shunt1}$ flows out via the shunt resistor $R_{shunt}$, as shown in FIG. 8C. When the shunt current $I_{shunt1}$ flows out, the battery current $I_{bat}$ has a value $I_{bat1}$ which corresponds to a subtraction of the shunt current $I_{shunt1}$ from the charging current $I_{chg}$, as shown in FIG. 8B. Accordingly, as shown in FIG. 8A, the charging of the battery voltage $V_{bat}$ can be suppressed after time $t_1$.

In the first embodiment, when the detection voltage $V_{chg}$ reaches the second detection voltage $V_{chg2}$ with the lapse of time $t_2$ as shown in FIG. 8A, the detection voltage $V_{chg}$ may be increased from $V_{chg2}$ to $V_{chg3}$ (not shown) by further increasing the resistance of the resistor $R_3$. At this time, by decreasing the resistance of the resistor $R_1$, the shunt current $I_{shunt}$ is increased to $I_{shunt2}$ as shown in FIG. 8C. The shunt current $I_{shunt}$ is expressed by the following equation (4).

$$I_{shunt} = \{[R_2/(R_1+R_2)]V_{bat}\}R_{shunt} \quad (4)$$

When the shunt current $I_{shunt2}$ flows out, the battery current $I_{bat}$ has a value $I_{bat2}$ which corresponds to a subtraction of the shunt current $I_{shunt1}$ from the charging current $I_{chg}$, as shown in FIG. 8B. Accordingly, as shown in FIG. 8A, the charging of the battery voltage $V_{bat}$ can be further suppressed after time $t_2$.

After that, similarly, the resistance of the resistor $R_3$ and the resistance of the resistor $R_1$ may be further changed. This step is repeated by the required number of times by which all cells $C_1$, $C_2$, $C_3$, ..., $C_{n-2}$, $C_{n-1}$ and $C_n$ reach the full charging voltage with good balance. This can achieve a charging system having little loss as possible.

As described above, in the first embodiment, the shunt current $I_{shunt}$ can be adjusted to an optimal value depending on the battery voltage $V_{bat}$. That is, while increasing the detection voltage $V_{chg}$ step by step, the shunt current $I_{shunt}$ is increased whenever the detection voltage $V_{chg}$ reaches the reference voltage $V_{ref}$. This can more limit the battery current $I_{bat}$ than the basic configuration, thereby further preventing the increase in the battery voltage $V_{bat}$. Accordingly, the cells C can be prevented from being overcharged even when the cells C are deteriorated with aging. In addition, the adjustment can be easily made since the resistors $R_1$ and $R_3$ on the sense lines only have to be adjusted with no need to adjust the shunt resistor $R_{shunt}$ on the shunt line.

[Second Embodiment]

A second embodiment will now be described with a stress placed on differences from the first embodiment.

(Shunt Circuit)

Figure 9:
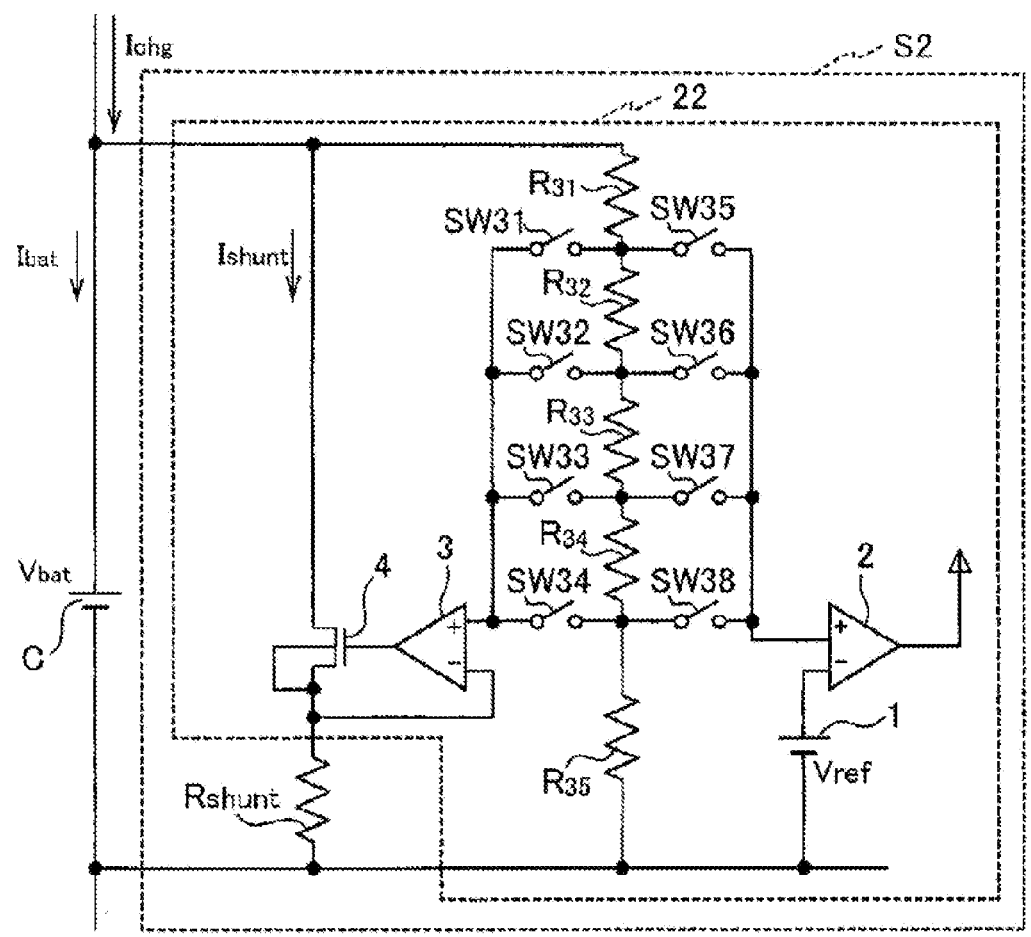
FIG. 9 is a schematic circuit block diagram of a shunt circuit according to a second embodiment.

FIG. 9 is a schematic circuit block diagram of a shunt circuit S2 according to the second embodiment. In the shunt circuit S2 according to the second embodiment, the first sense resistors $R_3$ and $R_4$ and the second sense resistors $R_1$ and $R_2$ in the shunt circuit S1 according to the first embodiment shown in FIG. 5 are replaced with common resistors $R_{31}$, $R_{32}$, $R_{33}$, $R_{34}$ and $R_{35}$.

As shown in FIG. 9, the shunt circuit S2 according to the second embodiment includes a reference voltage generator 1, a first OP amplifier 2, a second OP amplifier 3, a transistor 4, resistors $R_{31}$, $R_{32}$, $R_{33}$, $R_{34}$ and $R_{35}$, a shunt resistor $R_{shunt}$ and switches S31 to S38. The resistors $R_{31}$, $R_{32}$, $R_{33}$, $R_{34}$ and $R_{35}$ are connected in series and the switches SW31 to SW38 are switched as necessary. This can achieve the simpler configuration having variable resistors similar to the variable resistors $R_1$ and $R_3$ in the shunt circuit S1 according to the first embodiment, as will be described below.

Figure 10A:
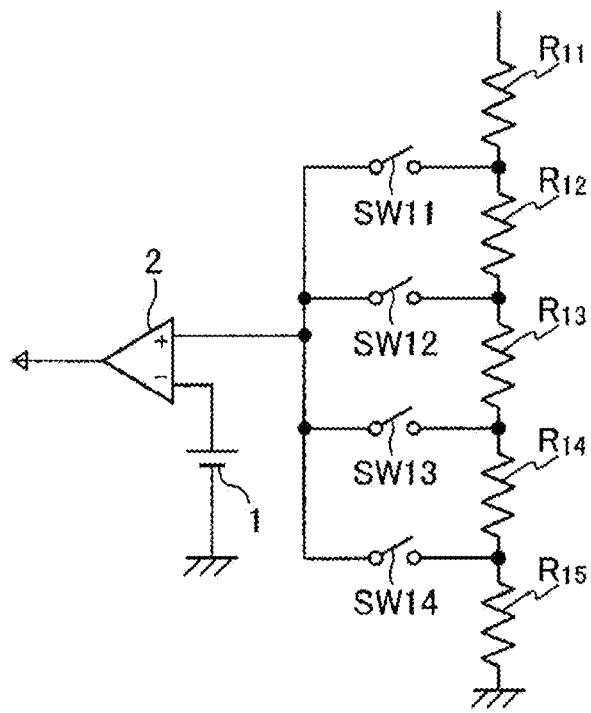
FIG. 10A is a schematic circuit block diagram of the neighborhood of a first OP amplifier in the shunt circuit according to the second embodiment.
Figure 10B:
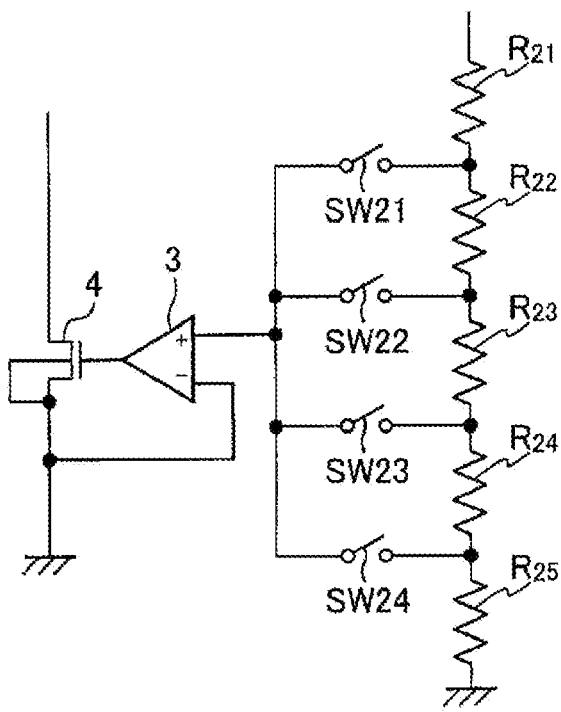
FIG. 10B is a schematic circuit block diagram of the neighborhood of a second OP amplifier in the shunt circuit according to the second embodiment.

FIG. 10A is a schematic circuit block diagram of the neighborhood of the first OP amplifier 2 and FIG. 10B is a schematic circuit block diagram of the neighborhood of the second OP amplifier 3 in the shunt circuit S2 according to the second embodiment. For example, as shown in FIG. 10A, switches SW11 to SW14 are interposed between the first OP amplifier 2 and resistors $R_{11}$, $R_{12}$, $R_{13}$, $R_{14}$ and $R_{15}$ (first sense resistors). One end of each of the switches SW11 to SW14 is connected to a non-inverted input terminal of the first OP amplifier 2. The other ends of the switches SW11 to SW14 are connected between the resistors $R_{11}$ and $R_{12}$, between the resistors $R_{12}$ and $R_{13}$, between the resistors $R_{13}$ and $R_{14}$ and between the resistors $R_{14}$ and $R_{15}$, respectively. In this case, when the switches SW11 to SW14 are switched, the resistances of the first sense resistors can be changed.

Specifically, when the switch SW11 is switched on and the other switches SW12, SW13 and SW14 are switched off, the resistor $R_{11}$ corresponds to the resistor $R_3$ in the first embodiment and the resistors $R_{12}$, $R_{13}$, $R_{14}$ and $R_{15}$ correspond to the resistor $R_4$ in the first embodiment. When the switch SW12 is switched on and the other switches SW11, SW13 and SW14 are switched off, the resistors $R_{11}$ and $R_{12}$ correspond to the resistor $R_3$ in the first embodiment and the resistors $R_{13}$, $R_{14}$ and $R_{15}$ correspond to the resistor $R_4$ in the first embodiment. When the switch SW 13 is switched on and the other switches SW11, SW12 and SW14 are switched off, the resistors $R_{11}$, $R_{12}$ and $R_{13}$ correspond to the resistor $R_3$ in the first embodiment and the resistors $R_{14}$ and $R_{15}$ correspond to the resistor $R_4$ in the first embodiment. When the switch SW14 is switched on and the other switches SW11, SW12 and SW13 are switched off, the resistors $R_{11}$, $R_{12}$, $R_{13}$ and $R_{14}$ correspond to the resistor $R_3$ in the first embodiment and the resistor $R_{15}$ correspond to the resistor $R_4$ in the first embodiment.

Similarly, as shown in FIG. 10B, switches SW21 to SW24 are interposed between the second OP amplifier 3 and resistors $R_{21}$, $R_{22}$, $R_{23}$, $R_{24}$ and $R_{25}$ (second sense resistors). One end of each of the switches SW21 to SW24 is connected to a non-inverted input terminal of the second OP amplifier 3. The other ends of the switches SW21 to SW24 are connected between the resistors $R_{21}$ and $R_{22}$, between the resistors $R_{22}$ and $R_{23}$, between the resistors $R_{23}$ and $R_{24}$ and between the resistors $R_{24}$ and $R_{25}$, respectively. In this case, when the switches SW21 to SW24 are switched, the resistances of the second sense resistors can be changed.

Specifically, when the switch SW21 is switched on and the other switches SW22, SW23 and SW24 are switched off, the resistor $R_{21}$ corresponds to the resistor $R_1$ in the first embodiment and the resistors $R_{22}$, $R_{23}$, $R_{24}$ and $R_{25}$ correspond to the resistor $R_2$ in the first embodiment. When the switch SW22 is switched on and the other switches SW21, SW23 and SW24 are switched off, the resistors $R_{21}$ and $R_{22}$ correspond to the resistor $R_1$ in the first embodiment and the resistors $R_{23}$, $R_{24}$ and $R_{25}$ correspond to the resistor $R_2$ in the first embodiment. When the switch SW 23 is switched on and the other switches SW21, SW22 and SW24 are switched off, the resistors $R_{21}$, $R_{22}$ and $R_{23}$ correspond to the resistor $R_1$ in the first embodiment and the resistors $R_{24}$ and $R_{25}$ correspond to the resistor $R_2$ in the first embodiment. When the switch SW24 is switched on and the other switches SW21, SW22 and SW23 are switched off, the resistors $R_{21}$, $R_{22}$, $R_{23}$ and $R_{24}$ correspond to the resistor $R_1$ in the first embodiment and the resistor $R_{25}$ correspond to the resistor $R_2$ in the first embodiment.

It is here noted that the resistors $R_{11}$ and $R_{21}$, the resistors $R_{12}$ and $R_{22}$, the resistors $R_{13}$ and $R_{23}$, the resistors $R_{14}$ and $R_{24}$ and the resistors $R_{15}$ and $R_{25}$ are configured with the common resistors $R_{31}$, $R_{32}$, $R_{33}$, $R_{34}$ and $R_{35}$ in the shunt circuit S2 shown in FIG. 9, respectively. The shunt circuit S2 can achieve variable resistors similar to the variable resistors $R_1$ and $R_3$ in the shunt circuit S1 according to the first embodiment, with the simpler configuration in which the switches SW31 to SW38 are switched as necessary.

A dotted line 22 shown in FIG. 9 indicates a range that may be mounted on an LSI (Large Scale Integration). Of course, the shunt resistor $R_{shunt}$ may also be mounted on the LSI.

(Charging System)

Figure 11:
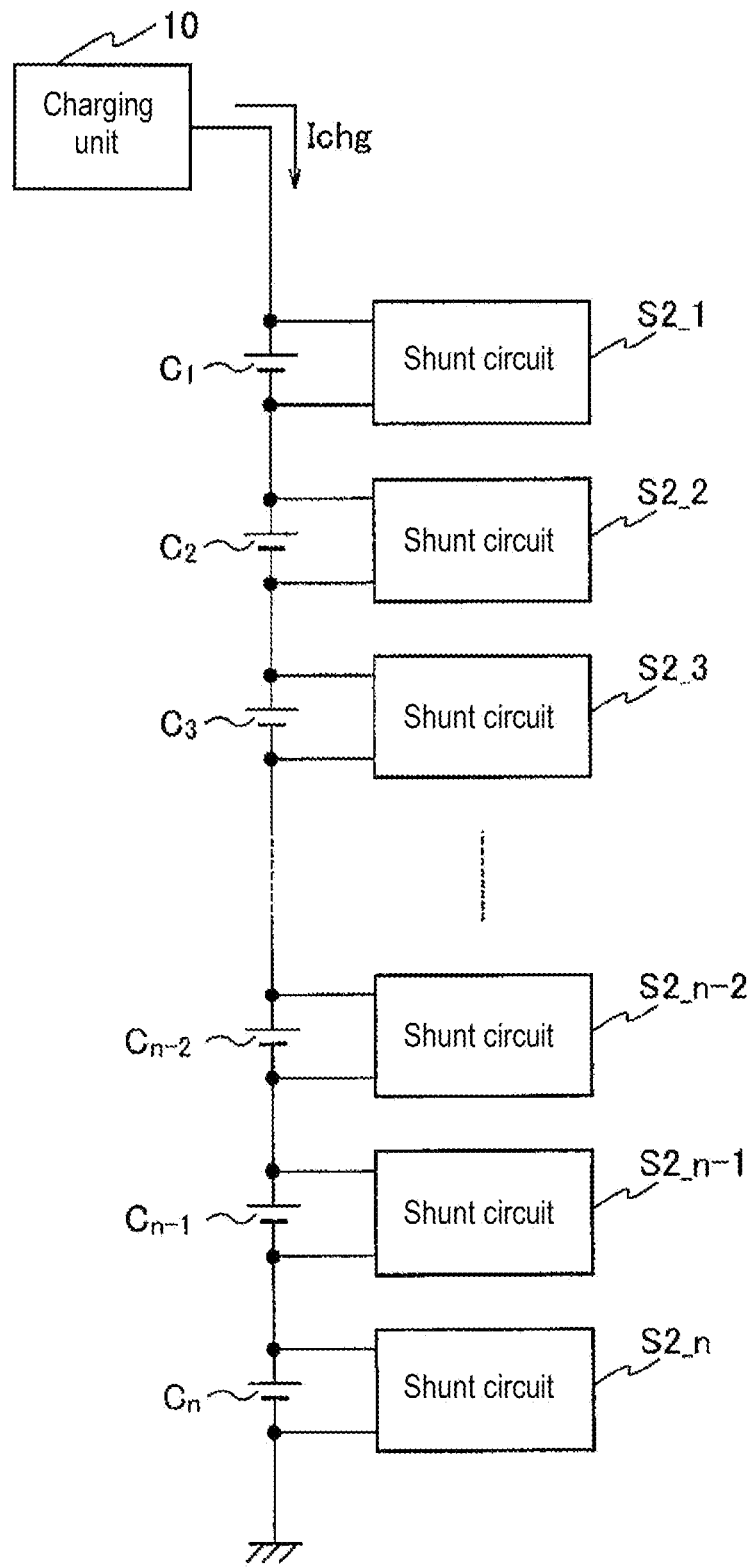
FIG. 11 is a schematic circuit block diagram of a charging system including the shunt circuit according to the second embodiment.

FIG. 11 is a schematic circuit block diagram of a charging system 120 according to the second embodiment. As shown in FIG. 11, the charging system 120 according to the second embodiment includes a charging unit 10 generating the charging current $I_{chg}$, a plurality of cells $C_1$, $C_2$, $C_3$, . . . , $C_{n-2}$, $C_{n-1}$ and $C_n$ connected in series to the charging unit 10, and a plurality of shunt circuits S2_1, S2_2, S2_3, . . . , S2_n–2, S2_n–1 and S2_n connected respectively in parallel to the plurality of cells $C_1$, $C_2$, $C_3$, . . . , $C_{n-2}$, $C_{n-1}$ and $C_n$. The charging system of the second embodiment has the same configuration as that of the first embodiment except the internal configuration of the shunt circuits S2_1, S2_2, S2_3, . . . , S2_n–2, S2_n–1 and S2_n.

Figure 12:
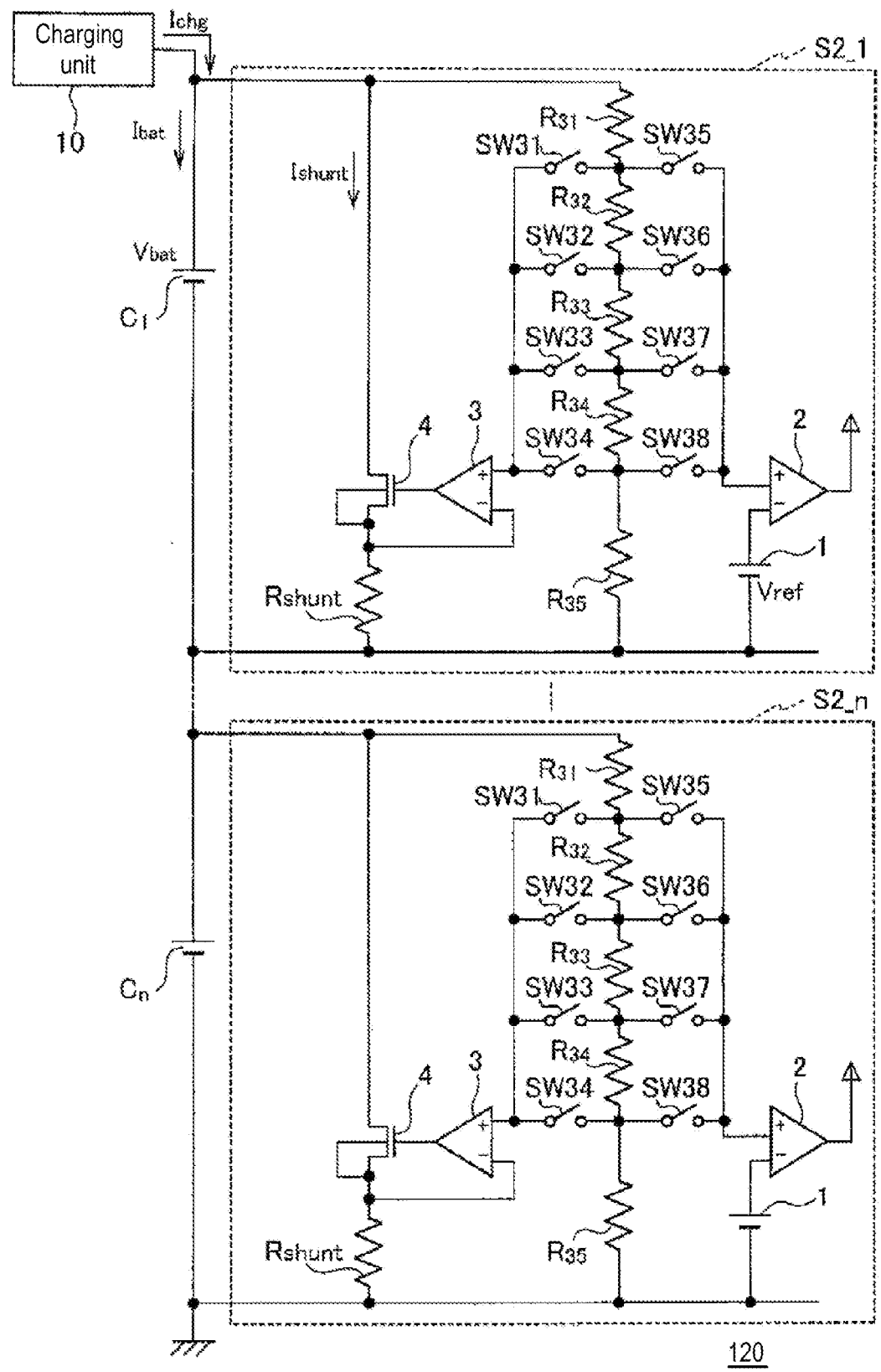
FIG. 12 is a detailed schematic circuit block diagram of the shunt circuit of the charging system according to the second embodiment.

FIG. 12 is a detailed schematic circuit block diagram of the charging system 120 according to the second embodiment. As shown in FIG. 12, the first OP amplifier 2 has a non-inverted input terminal connected to one end of each of the switches SW35 to SW38 and an inverted input terminal connected to a negative (−) terminal of the cell $C_1$ via the reference voltage generator 1. The second OP amplifier 3 has a non-inverted input terminal connected to one end of each of the switches SW31 to SW34 and an inverted input terminal connected to the negative (−) terminal of the cell $C_1$ via the shunt resistor $R_{shunt}$. The other ends of the switches SW31 and SW 35 are connected between the resistors $R_{31}$ and $R_{32}$, the other ends of the switches SW32 and SW36 are connected between the resistors $R_{32}$ and $R_{33}$, the other ends of the switches SW33 and SW37 are connected between the resistors $R_{33}$ and $R_{34}$, and the other ends of the switches SW34 and SW 38 are connected between the resistors $R_{34}$ and $R_{35}$. The transistor 4 has a drain connected to a positive (+) terminal of the cell $C_1$, a source connected to the negative terminal of the cell $C_1$ via the shunt resistor $R_{shunt}$, and a gate connected to an output terminal of the second OP amplifier 3.

The shunt circuit S2 of the second embodiment can achieve variable resistors similar to the variable resistors $R_1$ and $R_3$ in the shunt circuit S1 according to the first embodiment, with the simpler configuration in which the switches SW31 to SW38 are switched as necessary. The second embodiment is the same as the first embodiment in that, while increasing the detection voltage $V_{chg}$ step by step, the shunt current $I_{shunt}$ is increased whenever the detection voltage $V_{chg}$ reaches the reference voltage $V_{ref}$.

As described above, the second embodiment simplifies the shunt circuit S1 of the first embodiment by configuring the first and second sense resistors with the common resistors $R_{31}$, $R_{32}$, $R_{33}$, $R_{34}$ and $R_{35}$. This configuration can reduce a current generated depending on the first and second sense resistors.

Although it has been illustrated in the second embodiment that the five resistors $R_{31}$, $R_{32}$, $R_{33}$, $R_{34}$ and $R_{35}$ are connected in series, it is to be understood that the number of resistors used is not limited thereto and more resistors provide more precise control.

[Third Embodiment]

A third embodiment will now be described with a stress placed on differences from the first and second embodiments.

(Shunt Circuit)

Figure 13:
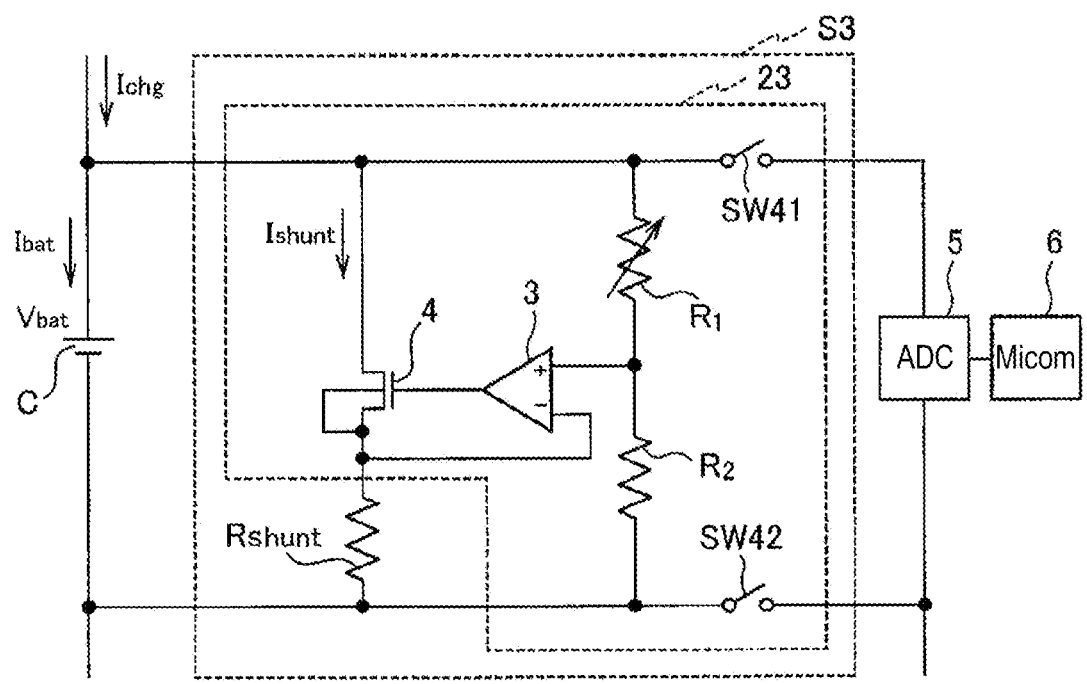
FIG. 13 is a schematic circuit block diagram of a shunt circuit according to a third embodiment.

FIG. 13 is a schematic circuit block diagram of a shunt circuit S3 according to the third embodiment. The shunt circuit S3 according to the third embodiment includes a shunt resistor $R_{shunt}$, a transistor 4 connected in parallel to a storage element C via the shunt resistor $R_{shunt}$, and a second OP amplifier 3 that shunts the shunt current $I_{shunt}$ from the charging current $I_{chg}$ by driving the transistor 4 when the battery voltage $V_{bat}$ supplied to the storage element C reaches a predetermined detection voltage $V_{chg}$. Whenever the detection voltage $V_{chg}$ reaches the reference voltage $V_{ref}$, the shunt current $I_{shunt}$ is increased.

Specifically, the shunt circuit S3 includes second sense resistors $R_1$ and $R_2$ connected to an input terminal of the second OP amplifier 3. The shunt current $I_{shunt}$ may be increased by changing the resistances of the second sense resistors $R_1$ and $R_2$.

As shown in FIG. 13, the shunt circuit S3 according to the third embodiment includes the second OP amplifier 3, the transistor 4, the resistors $R_1$ and $R_2$, the shunt resistor $R_{shunt}$ and switches SW41 and SW42. When the switches SW41 and SW42 are switched on, the shunt circuit S3 is connected to an AD converter 5 and is controlled by a microcomputer 6.

A dotted line 23 shown in FIG. 13 indicates a range that may be mounted on an LSI. Of course, the shunt resistor $R_{shunt}$ may also be mounted on the LSI. In addition, the LSI may be equipped with the AD converter 5 and the microcomputer 6 to act as a battery monitoring LSI.

(Charging System)

Figure 14:
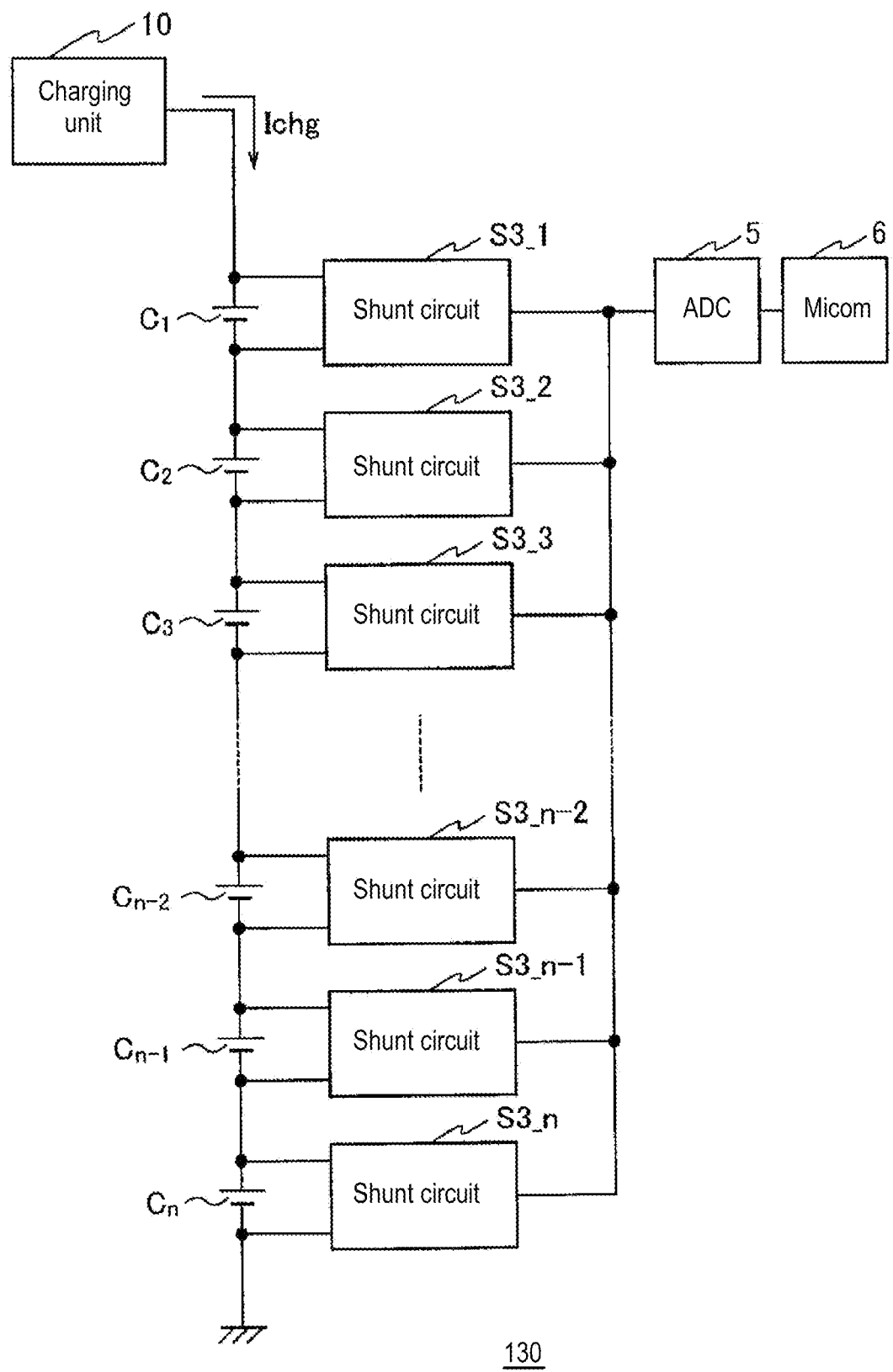
FIG. 14 is a schematic circuit block diagram of a charging system including the shunt circuit according to the third embodiment.

FIG. 14 is a schematic circuit block diagram of a charging system 130 according to the third embodiment. As shown in FIG. 14, in the charging system 130 according to the third embodiment, the AD converter 5 is connected to shunt circuits S3_1, S3_2, S3_3, . . . , S3_n-2, S3_n-1 and S3_n and the microcomputer 6 is connected to the AD converter 5. With this configuration, the battery voltage $V_{bat}$ is monitored by the AD converter 5 connected to the shunt circuits S3_1, S3_2, S3_3, . . . , S3_n-2, S3_n-1 and S3_n and the shunt current $I_{shunt}$ is increased under control of the microcomputer 6 based on a result of the monitoring.

Figure 15:
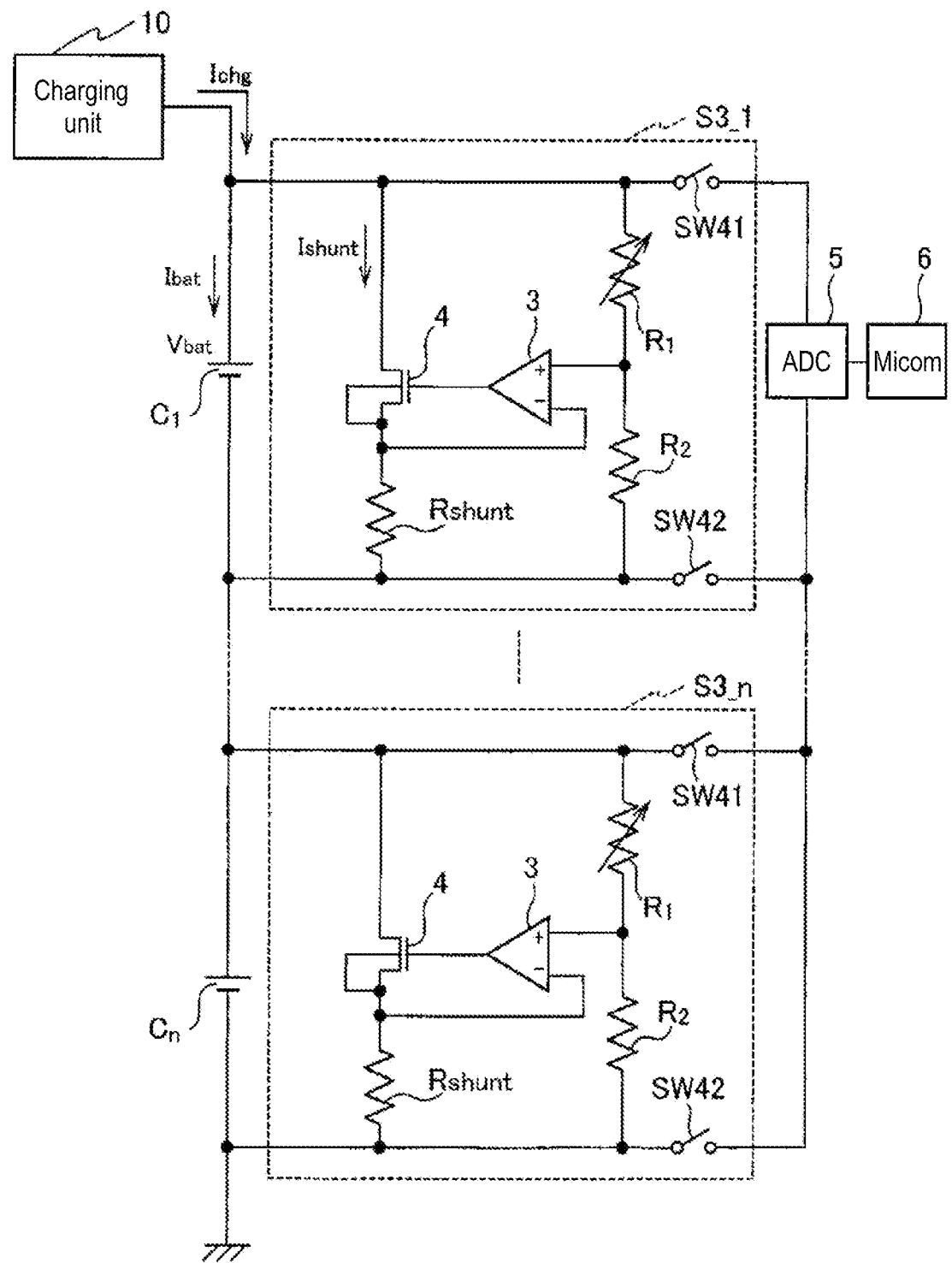
FIG. 15 is a detailed schematic circuit block diagram of the shunt circuit of the charging system according to the third embodiment.

FIG. 15 is a detailed schematic circuit block diagram of the charging system 130 according to the third embodiment. As shown in FIG. 15, the second OP amplifier 3 has a non-inverted input terminal connected to both terminals of the cell $C_1$ via the resistors $R_1$ and $R_2$ and an inverted input terminal connected to a negative (−) terminal of the cell $C_1$ via the shunt resistor $R_{shunt}$. The transistor 4 has a drain connected to a positive (+) terminal of the cell $C_1$, a source connected to the negative terminal of the cell $C_1$ via the shunt resistor $R_{shunt}$ and a gate connected to an output terminal of the second OP amplifier. The AD converter 5 is connected to both terminals of the cell $C_1$ via the switches SW41 and SW42.

The third embodiment is the same as the first embodiment in that, while increasing the detection voltage $V_{chg}$ step by step, the shunt current $I_{shunt}$ is increased whenever the battery voltage $V_{bat}$ reaches the detection voltage $V_{chg}$. That is, when the switches SW41 and SW42 are switched on, the AD converter 5 monitors the battery voltage $V_{bat}$. Then, when the battery voltage $V_{bat}$ reaches the detection voltage $V_{chg}$, a detection signal is transmitted to the microcomputer 6. At this time, the detection voltage $V_{chg}$ is increased. Upon receiving the detection signal, the microcomputer 6 drives the transistor 4, thereby allowing the shunt current $I_{shunt}$ to flow out via the shunt resistor $R_{shunt}$. Thereafter, when the battery voltage $V_{bat}$ reaches the next detection voltage $V_{chg}$, the AD converter 5 increases the detection voltage $V_{chg}$ more. At this time, the microcomputer 6 increases the shunt current $I_{shunt}$ by decreasing the resistance of the resistor $R_1$. Thereafter, the same step is repeated by the required number of times.

As described above, in the third embodiment, the battery voltage $V_{bat}$ is monitored by the AD converter 5 connected to the shunt circuits S3_1, S3_2, S3_3, . . . , S3_n-2, S3_n-1 and S3_n and the shunt current $I_{shunt}$ is increased under control of the microcomputer 6 based on a result of the monitoring. Thus, it is possible to reduce the size of the shunt circuits S3 and perform a high degree of control.

As described above, the present disclosure can provide a shunt circuit, a charging system and an integrated circuit which can prevent cells from being overcharged.

[Other Embodiments]

As described above, although the present disclosure has been described with the first to third embodiments, the description and drawings which constitute a part of this disclosure are exemplary and should not be construed to limit the present disclosure. Various alternative embodiments, examples and operation techniques will be apparent to those skilled in the art from this disclosure.

Thus, the present disclosure includes various embodiments which are not described herein.

INDUSTRIAL APPLICABILITY

The shunt circuit, the charging system and the integrated circuit according to the present disclosure can be utilized in various devices and apparatuses using a storage element, such as automobiles, industrial equipment, power generators, mobile devices, UPS (Uninterruptible Power Supply), power tools, etc.

Further, as the storage element, it is possible to use a lithium-ion battery cell, an electric double layer capacitor cell, a lithium ion capacitor cells, a SCiB cell and the like.

According to the present disclosure in some embodiments, it is possible to provide a shunt circuit, a charging system and an integrated circuit which can prevent cells from being overcharged.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A shunt circuit comprising:
   a shunt resistor having a resistance ($R_{shunt}$);
   a transistor connected in parallel to a storage element via the shunt resistor;
   a first resistor having a resistance (R3), a first end of the first resistor connected to the storage element having a battery voltage ($V_{bat}$);
   a second resistor having a resistance (R4), and connected to a second end of the first resistor;
   a first OP amplifier configured to compare a reference voltage ($V_{ref}$) with a detection voltage ($V_{chg}$) detected at the second end of the first resistor;
   a second OP amplifier configured to drive the transistor to shunt a shunt current ($I_{shunt}$) from a charging current supplied from a charging unit when detection voltage ($V_{chg}$) reaches the reference voltage ($V_{ref}$);
   a third resistor, having a resistance (R1), connected to an input terminal of the second OP amplifier; and
   a fourth resistor, having a resistance (R2), connected to the input terminal of the second OP amplifier and the first end of the third resistor,
   wherein the resistance ($R_3$) is increased to a first value of the resistance ($R_3$) and the resistance ($R_1$) is decreased to a first value of the resistance ($R_1$) based on a first output voltage of the first OP amplifier when the detection voltage ($V_{chg}$) reaches a first detection voltage value ($V_{chg1}$), and
   wherein the resistance ($R_3$) is increased to a second value of the resistance ($R_3$) higher than the first value of the resistance ($R_3$) and the resistance ($R_1$) is decreased to a second value of the resistance ($R_1$) lower than the first value of the resistance ($R_1$) based on a second output voltage of the first OP amplifier when the detection voltage ($V_{chg}$) reaches a second detection voltage value ($V_{chg2}$) after reaching the first detection voltage value ($V_{chg1}$).

2. The shunt circuit of claim 1, wherein the shunt current ($I_{shunt}$) is increased according to an equation of $I_{shunt} = \{[R_2/(R_1+R_2)]V_{bat}\}R_{shunt}$ by changing the resistance ($R_1$).

3. The shunt circuit of claim 1, wherein the detection voltage ($V_{chg}$) changes according to an equation of $V_{chg} = R4/(R3+R4) \cdot V_{bat} = V_{ref}$ by changing the resistance ($R_3$).

4. The shunt circuit of claim 1, wherein the shunt resistor is connected to a source of the transistor.

5. The shunt circuit of claim 1, wherein the storage element is one selected from a group consisting of a lithium ion battery cell, an electric double layer capacitor cell, a lithium ion capacitor cell and a SCiB cell.

6. An integrated circuit equipped with the shunt circuit of claim 1.

7. A charging system comprising:
   a charging unit configured to generate a charging current;
   a plurality of storage elements connected in series to the charging unit; and
   a plurality of shunt circuits which are connected respectively in parallel to the plurality of storage cells,
   wherein each of the plurality of shunt circuits is configured to shunt a shunt current from the charging current when a detection voltage ($V_{chg}$) detected within each of the plurality of shunt circuits reaches a reference voltage ($V_{ref}$), and increase the detection voltage ($V_{chg}$) step by step and increase the shunt current whenever the detection voltage ($V_{ref}$) reaches the reference voltage ($V_{ref}$),
   wherein each of the plurality of shunt circuits includes:
   shunt resistor having a resistance ($R_{shunt}$);
   a transistor connected in parallel to a storage element via the shunt resistor;
   a first resistor having a resistance ($R_3$), a first end of the first resistor connected to the storage element having a battery voltage ($V_{bat}$);
   a second resistor having a resistance ($R_4$), and connected to a second end of the first resistor
   a first OP amplifier configured to compare the reference voltage (Vref) with the detection voltage ($V_{chg}$) detected at the second end of the first resistor;
   a second OP amplifier configured to drive the transistor to shunt a shunt current ($I_{shunt}$) from a charging current supplied from a charging unit when detection voltage ($V_{chg}$) reaches the reference voltage ($V_{ref}$);
   a third resistor, having a resistance (R1), connected to an input terminal of the second OP amplifier; and
   a fourth resistor having, a resistance (R2) connected to the input terminal of the second OP amplifier and the first end of the third resistor,
   wherein the resistance ($R_3$) is increased to a first value of the resistance ($R_3$) and the resistance ($R_1$) is decreased to a first value of the resistance ($R_1$) based on a first output voltage of the first OP amplifier when the detection voltage ($V_{chg}$) reaches a first detection voltage value ($V_{chg1}$), and
   wherein the resistance ($R_3$) is increased to a second value of the resistance ($R_3$) higher than the first value of the resistance ($R_3$) and the resistance ($R_1$) is decreased to a second value of the resistance ($R_1$) lower than the first value of the resistance ($R_1$) based on a second output voltage of the first OP amplifier when the detection voltage ($V_{chg}$) reaches a second detection voltage value ($V_{chg2}$) after reaching the first detection voltage value ($V_{chg1}$).

8. The charging system of claim 7, wherein the shunt current ($I_{shunt}$) is increased according to an equation of $I_{shunt} = \{[R_2/(R_1+R_2)]V_{bat}\}/R_{shunt}$ by changing the resistance ($R_1$).

9. The charging system of claim 7, wherein the detection voltage ($V_{chg}$) changes according to an equation of $V_{chg} = R4/(R3+R4) \cdot V_{bat} = V_{ref}$ by changing the resistance ($R_3$).

10. The charging system of claim 7, wherein the shunt resistor is connected to a source of the transistor.

11. The charging system of claim 7, wherein the battery voltage ($V_{bat}$) is monitored by an AD converter connected to the shunt circuit and the shunt current is increased under control of a microcomputer based on a result of the monitoring.

12. The charging system of claim 7, wherein the storage element is one selected from a group consisting of a lithium ion battery cell, an electric double layer capacitor cell, a lithium ion capacitor cell and a SCiB cell.

* * * * *